(12) United States Patent
Van Vonderen et al.

(10) Patent No.: US 10,225,430 B2
(45) Date of Patent: Mar. 5, 2019

(54) METHOD OF ESTIMATING A USAGE OF PRINTING MATERIALS FOR PRINT JOBS

(71) Applicant: Océ Holding B.V., Venlo (NL)

(72) Inventors: Lambertus A. H. Van Vonderen, Venlo (NL); Klaas Jan Wierda, Venlo (NL); Andreas Wierda, Venlo (NL); Hugouw T. Schenk, Venlo (NL); Norbert J. M. Janssen, Venlo (NL); Roelof Hamberg, Venlo (NL); Christianus J. M. G. Van Rijt, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/724,425

(22) Filed: Oct. 4, 2017

(65) Prior Publication Data

US 2018/0103176 A1     Apr. 12, 2018

(30) Foreign Application Priority Data

Oct. 11, 2016 (EP) .................................. 16193393

(51) Int. Cl.
*H04N 1/23* (2006.01)
*G03G 15/00* (2006.01)
(Continued)

(52) U.S. Cl.
CPC ....... *H04N 1/2346* (2013.01); *G03G 15/5016* (2013.01); *G03G 15/556* (2013.01);
(Continued)

(58) Field of Classification Search
USPC ....................................................... 358/1.16
See application file for complete search history.

(56) References Cited

U.S. PATENT DOCUMENTS

| 6,266,493 B1 | 7/2001 | Farrell et al. |
| 8,953,997 B2 | 2/2015 | Van Vliembergen et al. |
| 2004/0218197 A1* | 11/2004 | Vliembergen ......... G06K 15/00 358/1.6 |

FOREIGN PATENT DOCUMENTS

| EP | 1 473 661 A1 | 11/2004 |
| EP | 2 945 051 A1 | 11/2015 |
| JP | 2008-70832 A | 3/2008 |

OTHER PUBLICATIONS

Hideljiro, Image Formimg Apparatus and Charge Calculation Device Related to Image Fornming Apparatus, Mar. 27, 2008, Machine Translated Japanese Patent Application Publication, JP2008-070832 listed on IDS, All Pages.*

(Continued)

*Primary Examiner* — Ngon B Nguyen
(74) *Attorney, Agent, or Firm* — Birch, Stewart, Kolasch & Birch, LLP

(57) ABSTRACT

The invention relates to a printing system for printing a print job on a receiving material with receiving material characteristics according to a print job ticket. The printing system comprises a print engine for providing marking material with marking material characteristics to the receiving material in order to form at least one image defined by the print job and a controller configured to control the print engine and to provide a first estimation of an amount of receiving material needed for a print job based on the print job ticket. A digital outcome storage is configured to store first waste amounts of receiving material during printing errors of print jobs. The controller is configured to retrieve from the digital outcome storage first waste amounts of receiving material with the same receiving material characteristics as of the print job and to use the retrieved first waste amounts of receiving material for increasing of the first estimation of the amount of receiving material needed by the print job.

15 Claims, 5 Drawing Sheets

(51) Int. Cl.
*G06K 15/00* (2006.01)
*B41J 2/17* (2006.01)
(52) U.S. Cl.
CPC ....... *G06K 15/4065* (2013.01); *H04N 1/2392* (2013.01); *B41J 2/1721* (2013.01)

(56) References Cited

OTHER PUBLICATIONS

European Search Report for EP 16 19 3393 dated Apr. 6, 2017.

* cited by examiner

| Job No | Media Type | Operator Skill Factor | No of sheets in print job | Finishing Action | # Waste sheets for printing | # Waste sheets for finishing |
|---|---|---|---|---|---|---|
| 10001 | A4 80 g/m² | 1 | 100 | Stapling | 0 | 0 |
| 10002 | A4 80 g/m² | 1 | 100 | Folding | 4 | 4 |
| 10003 | A3 100 g/m² | 1 | 500 | Laminating | 5 | 15 |
| 10004 | A3 120 g/m² | 1 | 700 | Laminating | 5 | 30 |
| 10005 | A4 80 g/m² | 0.7 | 100 | Stapling | 1 | 1 |
| 10006 | B4 80 g/m² | 0.7 | 50 | Folding | 2 | 2 |
| 10007 | A4 100 g/m² | 0.7 | 500 | None | 3 | 0 |
| 10008 | A4 120 g/m² | 0.7 | 700 | Book Binding | 7 | 15 |
| 10009 | A4 80 g/m² | 0.5 | 100 | Folding | 2 | 8 |
| 10010 | Letter 80 g/m² | 0.5 | 250 | Laminating | 2 | 15 |

Fig. 3

METHOD OF ESTIMATING A USAGE OF PRINTING MATERIALS FOR PRINT JOBS

The invention relates to a printing system for printing a print job on a receiving material with receiving material characteristics according to a print job ticket, the printing system comprising a print engine for providing marking material with marking material characteristics to the receiving material in order to form at least one image defined by the print job and a controller configured to control the print engine, to provide a first estimation of an amount of receiving material needed for a print job based on the print job ticket.

Hereinafter receiving material may also be mentioned as print media or media. Receiving material is for example sheets of paper, plastic sheets, rolls of paper, rolls of plastics, wood, glass, textile or other material upon which marking material like ink, toner, etc. is deposited in order to form an image.

In an image reproduction system, e.g. a printing system, it is a typical scenario that a plurality of print jobs is waiting in a print queue until they are processed. An electronic controller of the printing system has among others the task to schedule the print jobs, i.e. to establish an amount of receiving material needed to process the jobs as for example described in U.S. Pat. No. 8,953,997.

The amount of receiving material is typically displayed on a user interface of the printing system so as to give the users at least a rough estimate as to what amount of receiving material is needed for their jobs to be processed—printed and sometimes also finished. More importantly, a schedule permits to alert an operator of the printing system of the timings at which certain actions such as providing a supply of receiving material, removing printed copies from a discharge tray, removing a printed roll of paper and the like.

In the course of the printing and finishing process problems may occur like paper jams, misprints, printer runnability, errors due to low skills of an operator and finisher run-in.

It is an object of the invention to improve the accuracy of the estimated amounts of printing materials needed to print and finish a print job.

In order to achieve this object, the printing system according to the invention comprises a digital outcome storage configured to store first waste amounts of receiving material during printing errors of print jobs, and the controller is configured to retrieve from the digital outcome storage first waste amounts of receiving material with the same receiving material characteristics as of the print job and to use the retrieved first waste amounts of receiving material for increasing of the first estimation of the amount of receiving material needed by the print job.

Thus, according to the invention, an extra amount of receiving material is estimated to be used during printing of a print job. The extra amount is derived from amounts of receiving material actually used in previous print jobs which have used the same type of receiving material. A higher media requirement is determined in order to compensate for predicted losses in a workflow of the printing system. The increased media amount includes a calculated safety margin which takes waste into account. The calculated margin may be applied in different user interactions. In one user interaction the increased amount is displayed on a user interface of the printing system when media is required. In a second user interaction the increased amount is taken along in a print job cost estimator application. In a third user interaction the increased amount is taken along in an automatic media ordering in the print queue. In a fourth user interaction the increased amount is taken along in the print job settings. For example, in the fourth user interaction, whenever a print job for 100 booklets is submitted to the printing system, the controller may update a run length to 110 to compensate for the predicted run-in waste of the booklet maker. By doing so, this increase does not need to be handled in the pre-press department manually and does not require reprinting additional copies after finishing.

According to an embodiment the controller is configured to provide a first estimation of an amount of marking material needed for the print job based on the print job ticket, the digital outcome storage is configured to store first waste amounts of marking material during printing errors of print jobs, and the controller is configured to retrieve from the digital outcome storage first waste amounts of marking material with the same marking material characteristics as of the print job and to use the retrieved first waste amounts of marking material for increasing the first estimation of the amount of marking material needed by the print job. The first estimation may also be based on a model of the printing system which may be internal positioned in the controller of the printing system or externally located on auxiliary hardware components and/or software components.

According to an embodiment the printing system comprises a finisher with finisher characteristics for finishing the print job, the controller is configured to provide a first estimation of an amount of finishing material needed for the print job based on the print job ticket, the digital outcome storage is configured to store second waste amounts of receiving material, second waste amounts of marking material and first waste amounts of finishing material during finishing errors of print jobs, and the controller is configured to provide the first estimations of the amounts of receiving, marking and finishing material, to retrieve from the digital outcome storage the first waste amounts of receiving material, marking material and finishing material, and the second waste amounts of receiving material and marking material with the same receiving material, marking material, finishing material and finisher characteristics respectively as of the print job, and to use the retrieved first and second waste amounts for increasing the first estimations of the amounts of receiving, marking and finishing material needed by the print job.

According to an embodiment the printing system comprises a user interface for communication with an operator of the printing system, which user interface is configured to display the increased first estimation.

According to an embodiment the user interface is configured to receive the waste amounts after each print job in order to store the waste amounts in the digital outcome storage. Machine learning from actual use by the printing system or by a fleet of printing systems coupled in a network to the printing system may be envisioned. The learning system may be fed by means of data of the amounts of required receiving material.

Such data may be filled in by an operator after printing and finishing each print job. The waste amounts may also be stored externally from the printing system via an intranet network, via an internet network or via a cloud service system in order to provide other printing systems with the waste amounts information.

According to an embodiment the controller is configured to establish the waste amounts during each print job and to store the waste amounts in the digital outcome storage.

According to an embodiment the controller is configured to receive waste amounts of another printing system which is connected to a same network as the printing system and to store the waste amounts of the other printing system in the digital outcome storage.

The invention also relates to a method for a printing system for printing a print job on a receiving material with receiving material characteristics according to a print job ticket, the method comprising the steps of receiving a print job with a print job ticket, providing a first estimation of an amount of receiving material needed for a print job based on the print job ticket, retrieving waste amounts of receiving material with the same receiving material characteristics as of the print job, and increasing the first estimation of the amount of receiving material needed by the print job based on the retrieved waste amounts of receiving material.

According to an embodiment the method comprises the steps of processing the print job according to the print job ticket, receiving waste amounts of receiving material wasted during processing of the print job and storing the waste amounts with properties of the print job and with the receiving material characteristics in a digital outcome storage of the printing system. The processing of the print job may comprise printing of the print job by the print engine and, if specified, finishing of the prints by a finisher.

According to an embodiment the step of increasing the first estimation takes into account the degree of skills of the operator handling the print job. By doing so, even a low skilled operator will order or load proper amounts of media.

According to an embodiment the method comprises the steps of providing a first estimation of an amount of marking material needed for a print job based on the print job ticket, retrieving waste amounts of marking material with the same marking material characteristics as of the print job, and increasing the first estimation of the amount of marking material needed by the print job based on the retrieved waste amounts of marking material.

According to an embodiment of the method the printing system comprises a finisher with finisher characteristics for finishing the print job using finishing material and the method comprises the steps of providing a first estimation of an amount of finishing material needed for the print job based on the print job ticket, retrieving waste amounts of receiving material, marking material and finishing material during finishing of the print job by the finisher, the waste amounts of receiving, marking and finishing material with the same receiving, marking and finishing material and finisher characteristics respectively as of the print job, and increasing the first estimations of the amounts of receiving, marking and finishing material needed by the print job based on the retrieved waste amounts in the previous step.

The invention also relates to a non-transitory recording medium comprising computer-executable program code configured to instruct a controller of a printing system according to the invention and a computer to perform a method according to the invention.

Embodiment examples will now be described in conjunction with the drawings, wherein:

FIG. 3 is an example of a digital outcome storage in the form of a digital table comprising a history of print jobs with waste amounts per print job;

Figure 1:
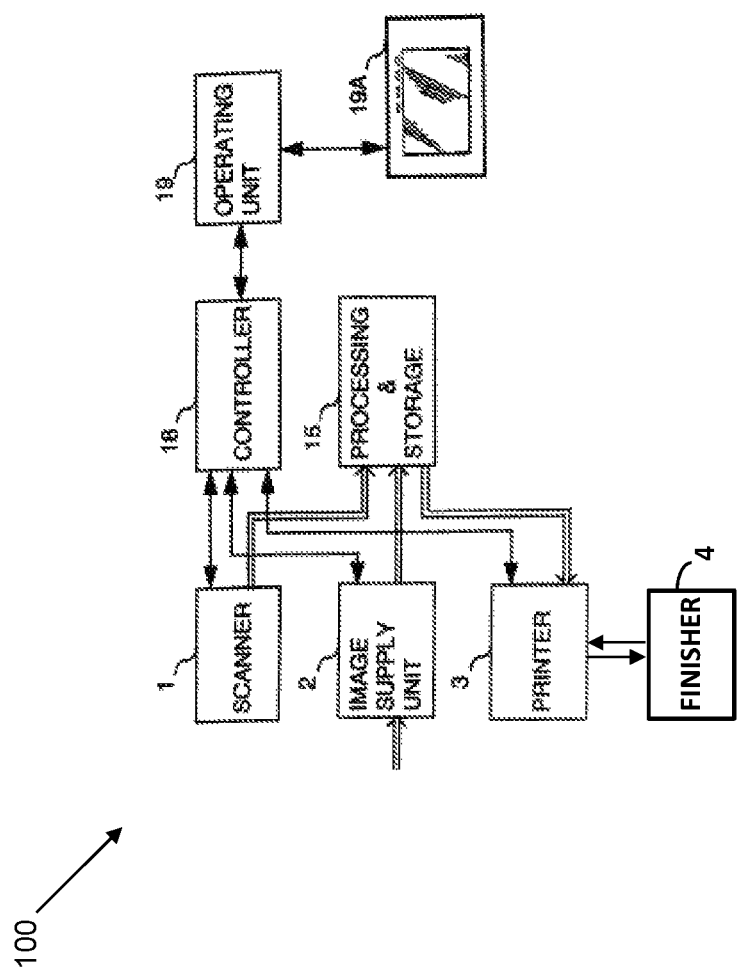
FIG. 1 is a diagram of a printing system to which the invention is applicable.

FIG. 1 shows the general arrangement of a printing system 100 according to the invention. The printing system 100 comprises a scanner 1 for opto-electrical scanning of a document and delivering digital image information corresponding thereto, a feeder 2 for feeding image information from an external source to the print system and a print engine 3 for printing digital image information on the receiving material. The feeder 2 is configured to receive a print job with a print job ticket comprising a plurality of print job settings. Both the scanner 1 and the feeder unit 2 are connected to a digital device 15 for processing and intermediate storage of image information. The digital device 15 is configured to store first waste amounts of receiving material during printing errors of print jobs. The digital device 15 is in turn connected to the print engine 3. The scanner 1, feeder unit 2, device 15 and print engine 3 are connected to a central control 18, which is also connected to an operator control unit 19. The operator control unit 19 is provided with an operator control panel 19A with operator control elements and a display element, for example an LCD screen in the form of a touch screen for use by an operator at the printing system 100. The operator control panel 19A may be remotely wireless connected to the printing system 100. The central control 18 comprises a print job queue for ordering the print jobs which are submitted to the printing system 100 via the feeder 2. The operating control unit 19 gathers information from the central control 18 and the digital device 15 in order to display the gathered information at the operator control panel 19A. The central control 18 comprises a storage for a plurality of printing system settings. The printing system settings determine a pre-printing process like a ripping process of a print job, a print process by the print engine 3, and a post-printing process like an inline finishing step. The printing system 100 may also comprise a finisher 4 for finishing printed receiving material like stapling, punching, book-binding, laminating, etc. In FIG. 1 the finisher has a two-directional communication with the print engine 3. However, a finisher having a one-directional communication with the print engine 3 or an offline finisher having no communication with the print engine 3 may be envisioned and fall under the scope of the invention.

An additional digital management system may be connected to the printing system 100 to deliver information from other printing systems to the central control 18.

The controller 18 is arranged to receive commands from the local user interface 19A or from remote user interfaces via the network and to control all operations of the feeder 2, the print engine 3 and the finisher 4. Further, the controller 18 controls the user interface 19A for displaying messages and other information on a display of the user interface.

The finisher 4 may be a device provided by the manufacturer of the controller 18. In that case, detailed information on the properties and capabilities of the finisher or finishers will be available in the controller 18. As an alternative, the finisher 4 may be an OEM finisher from another manufacturer which communicates with the controller 18 according to a standard DFD (Document Finishing Device) protocol. In that case, only limited information on the properties of the finisher may be available in the controller 18. At least, however, the controller receives a signal when a finishing process for a document or a set of documents has been completed.

When one or more print jobs are received at a print job receiving section, a specific module in the controller 18, a scheduler, another specific module in the controller 18 sorts the received jobs by their priorities and arranges them in a print queue which determines the sequence in which the jobs are to be processed. Further, based on more or less detailed information on the processing operations to be performed in the print engine 3 and the finisher 4, the scheduler calculates for each job a first estimate of the receiving material needed for processing the job. Based on this estimate, the scheduler calculates a time schedule which will be displayed on the user interface 19A (and possibly also on remote user interfaces). In the time schedule the moments in time for replenishment of the receiving material are indicated. At these moments the operator is assumed to open an input tray or a roll holder in order to refill the input tray with receiving material or to put another roll of receiving material on the roll holder.

Figure 2:
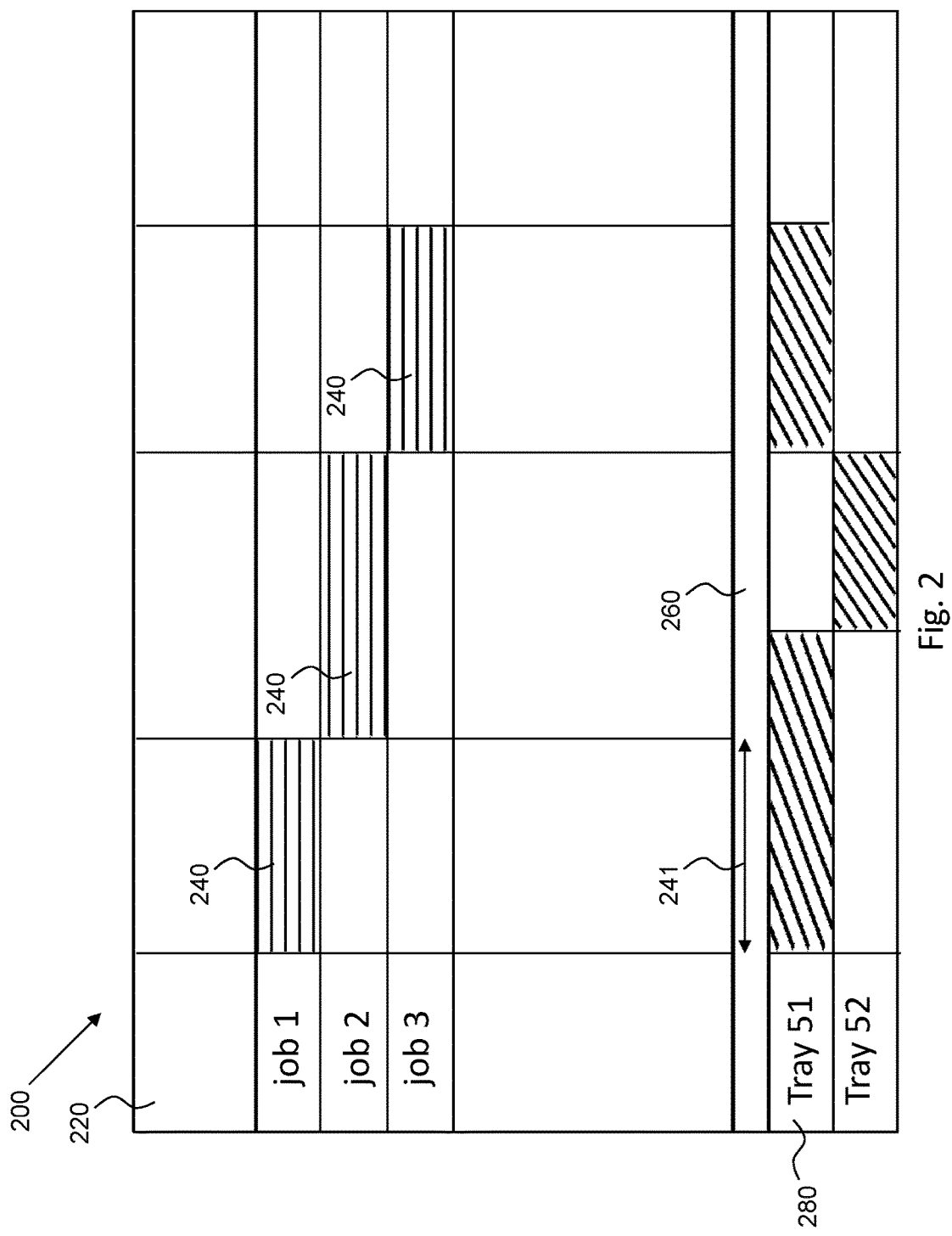
FIG. 2 shows an example of a job schedule as displayed on user interface of the printing system according to the invention.

FIG. 2 shows an example of such a time schedule 200 according to the prior art for the simple case that only three print jobs "job 1", "job 2", "job 3" are waiting in the print queue of a sheet printing system. A roll printing system may also be envisioned and falls under the scope of the invention. A column 220 on the left margin of the display screen identifies the print jobs, and a time bar 240 is displayed for each job. The time bars 240 symbolize the expected duration of the respective print job and indicate the start and end times of the jobs. These times can be read on a time scale 260 that is displayed below the time bars. A few lines 280 below the time scale 260 indicate the output trays 51, 52 and the times when these trays are expected to be busy with discharging printed copies. Thus, a user who has entered one of the print jobs may see at a glance when his job can be expected to be ready and from which tray the copies may be fetched. The expected durations according to the time bars 240 are derived from the printing speed, the number of pages of the document specified in the print job ticket of the print job and the number of copies of the document to be produced as specified in the print job ticket.

Further, although not shown in the drawings, the scheduler calculates the expected timings of certain events which require an activity from the user or the operator of the printing system, such as refilling a tray 51, 52, removing sheets from an output tray and the like.

The estimates for the duration of the job processing as symbolized by the time bars 240 in the schedule 200 may be based on a more or less detailed model of the processing operations that are to be performed in the processing system and the times needed for each of these operations. Since the print jobs waiting in the print queue will normally belong to different types which differ in the values of a set of attributes which determine how the media sheets are to be processed, different models may be needed for modeling the different job types and calculating the estimates for the processing duration. In this schedule 200 waste amounts of receiving material are not yet incorporated in the estimations of receiving material to be used and the corresponding estimations of the durations of the print jobs. The length of the time bar 240 for the print job "job 1" as indicated by double sided arrow 241 gives an estimation of the print job duration of the print job "job 1".

In order to take the waste amounts into account, a digital table 300 of the kind shown in FIG. 3 is stored in the digital outcome storage according to the invention. The digital outcome storage may be residing in the controller 18 or be connected via a digital network to the printing system 100 in FIG. 1. This table 300 lists all the print jobs that are typically processed on the printing system 100, each job type being characterized by a specific selection of values for the processing attributes that are selectable in the printing system 100 and form part of the job specifications of the received jobs. Also the operator who has done the print job is mentioned in the digital table 300 as well as the waste amounts of receiving material for each print job.

A first column 301 of the digital table 300 comprises an identifier for each print job.

A second column 302 comprises a media type used in the print job.

A third column 303 comprises an operator skill factor corresponding to an operator who has done the print job. For example, a richly skilled operator has a factor of 1.0, while a poorly skilled operator has a factor of 0.5. The operator who has done the print job may be derived from the scheduler of the printing system 100. However, if the operator who has done the job is not known, i.e. is not registered in the printing system 100, the third column 303 in the table 300 may be empty or the factors may be set to 1 for all jobs.

A fourth column 304 comprises a number of sheets as calculated from the print job ticket of the print job. The number of sheets may be the number of pages of a document in the print job multiplied by the number of requested copies in the print job ticket.

A fifth column 305 comprises a type of finishing action to be performed for the print job.

A sixth column 306 comprises a waste amount of receiving material in units of sheets per print job during the printing on the sheets.

A seventh column 307 comprises a waste amount of receiving material in units of sheets per print job during the finishing of the printed sheets. In a simplified embodiment only the values of the sixth column 306 are available and the values of the seventh column 307 are not available.

The table 300 is used to estimate a waste amount for the three print jobs "job 1", "job 2", "job 3" waiting in the print queue of the sheet printing system according to FIG. 2. For example, the print job ticket of print job "job 1" specifies A4 80 g/m2 as receiving material, 10 copies, a document of 20 pages and a folding finishing action. The number of sheets to be used according to the print job ticket is therefore 10*20=200 sheets.

A digital filter residing in the controller 18 of the printing system 100 is now applied to the digital table 300. Print jobs having a same media type and a same finishing action as print job "job 1" are retrieved by the filter. The print jobs identified with the numbers 10002, 10009 are thus retrieved by the filter.

From the values in the columns 303, 304, 306, 307 of the print jobs 10002, 10009 in table 300 an estimation for the waste amount of sheets for the specific print job "job 1" in schedule 200 of FIG. 2 is now derived.

The estimated amount may be calculated according to the following formula:

WASTE("job 1")=NoOfSheets("job 1")*Sum over retrieved jobs(Value(303)*(Value(306)+Value(307))/(OperatorSkillFactor("job 1")*(Sum over retrieved jobs(Value(304)))

wherein the OperatorSkillFactor of "job 1" is the skill factor of the operator who is going to do the print job "job 1", the NoOfSheets('job 1") is the number of sheets intended to be used for the print job "job 1" which is derivable from the print job ticket of "job 1" as elaborated upon here-above and the two summation parts are summarized over the print jobs 10002 and 10009 retrieved by the filter from the digital table 300.

If the skill factor of the operator who is going to do the print job 'job 1", is unknown to the printing system 100, the OperatorSkillFactor("job 1") may be assumed to be equal to 1.0 and set to 1.0 in the calculations.

According to digital table 300 the WASTE("job 1") is equal to 200*(1*(4+4)+0.5*(2+8))/(1*(100+100))=13 sheets.

The number of 13 sheets may be recalculated leading to an increased time duration of the print job "job 1" in the schedule 200 in FIG. 2. Also the few lines 280 below the time scale 260 indicate the output trays 51, 52 in FIG. 2 and the times when these trays 51, 52 are expected to be busy with discharging printed copies are adapted qua lengths of the bars in the few lines 280. From the tray 51 sheets are going to be taken to the print engine 3 of FIG. 1 for printing images on the sheets and to the finisher 4 of FIG. 1 for folding the printed sheets according to the specifications in the print job ticket of the print job "job 1".

For example, the number of sheets intended to be used for the print job "job 1", i.e. the length of the bar in the first of the few lines 280 in FIG. 2 will be increased by a factor 213/200 in an update schedule in which the waste amounts are taken into account. Also the duration of the print job "job 1", i.e. the length of the time bar 240 for the print job "job 1" as indicated by double sided arrow 241, will be increased by a factor 213/200 in an update schedule in which the waste amounts are taken into account.

The estimated amount may also be calculated otherwise according to the following formula. Especially when there is little or no correlation between waste during printing and waste during finishing this formula is applicable and advantageous.

Another kind of digital filtering may be applied to the digital table 300 using the filter residing in the controller 18 of the printing system 100. Print jobs having a same media type as print job "job 1" are retrieved by the filter. The print jobs identified with the numbers 10001, 10002, 10005 and 10009 are thus retrieved by the filter. These job numbers 10001, 10002, 10005, 10009 are temporarily stored and the filter is cleared. Then print jobs having a same finishing action as print job "job 1" are retrieved by the filter. The print jobs identified with the numbers 10002, 10006 and 10009 are thus retrieved by the filter. These job numbers 10002, 10006 and 10009 are temporarily stored.

From the values in the columns 303, 304 and 306 of the print jobs 10001, 10002, 10005 and 10009 in table 300 an estimation for the waste amount of sheets during printing of the specific print job "job 1" in schedule 200 of FIG. 2 is now derived. From the values in the columns 303, 304 and 307 of the print jobs 10002, 10006 and 10009 in table 300 an estimation for the waste amount of sheets during finishing of the specific print job "job 1" in schedule 200 of FIG. 2 is now derived.

The estimated amount may be calculated according to the following formula:

WASTE("job 1")=WASTEDuringPrinting("job 1")+
WASTEDuringFinishing("job 1") Wherein
WASTEDuringPrinting("job 1")=(NoOfSheets
("job 1")*Sum over retrieved jobs(Value(303)
*Value(306))/(OperatorSkillFactor("job 1")*
(Sum over retrieved jobs(Value(304))) and
WASTEDuringFinishing("job 1")=(NoOfSheets
("job 1")*Sum over retrieved jobs(Value(303)
*Value(307))/(OperatorSkillFactor("job 1")*
(Sum over retrieved jobs(Value(304))))

This method by the other kind of filtering has an advantage over the first method of filtering that more jobs may be used for the calculation of the waste amounts. The outcome may therefore be a more reliable estimation of the amounts.

According to digital table 300 the WASTEDuringPrinting ("job 1") is equal to 200*(1*0+1*4+0.7*1+0.5*2)/(1*(100+ 100+100+100))=2.85 sheets.

According to digital table 300 the WASTEDuringFinishing("job 1") is equal to 200*(1*4+0.7*2+0.5*8)/(1*(100+ 50+100))=7.52 sheets. So, WASTE("job 1")=2.85+ 7.52=9.37 sheets.

Same calculations may be performed for the other print jobs "job 2" and "job 3" in the print queue.

If the operator skill factors are differentiated with respect to printer and finisher, the calculations may be further refined.

According to an embodiment the user interface 19A of the printing system 100 in FIG. 1 is configured to receive the waste amounts after each print job in order to store the waste amounts in the sixth column 306 and the seventh column 307 of the digital table 300. An operator may manually enter the waste amounts after each print job via the user interface 19A.

According to another embodiment the controller 18 is configured to establish the waste amounts during each print job and to store the waste amounts in the sixth column 306 and the seventh column 307 of the digital table 300. The controller 18 may use input from sensors and/or counters in the input trays 51, 52 to derive the number of sheets that are guided to the print engine 3 from the start of the print job to the end of the print job.

According to an embodiment the controller is configured to receive waste amounts of another similar printing system which is connected to a same network as the printing system and to store the waste amounts of the other printing system in the digital table 300. An extra column specifying the printing system may be added in the digital table 300 and a waste weight factor for a specific type of printing system.

The examples in FIG. 2 and FIG. 3 may be extended to other embodiments of the invention wherein not only waste of receiving material for printing and finishing of a print job is taken into account, but also waste of marking material like ink, toner etc., and also waste of finishing material if needed in the print job, such as staples, glue, binding material, etc. Extra columns may be provided in the digital table 300 to store these additional amounts of waste.

Figure 4:
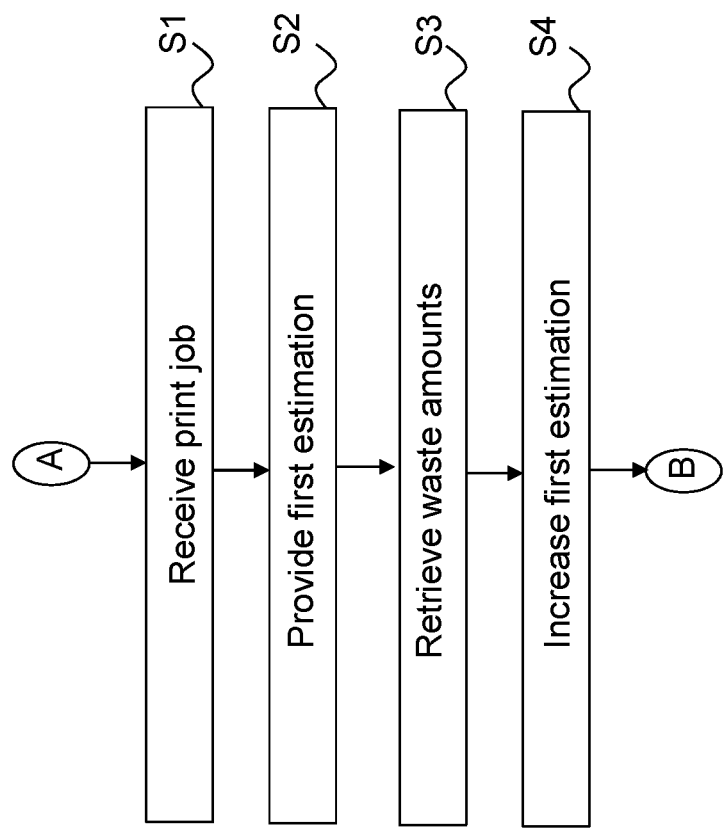
FIG. 4 is a flow diagram illustrating a first method according to the invention.

The essential steps of a representative example of the method according to the invention have been shown in a flow diagram in FIG. 4. A starting point A of the flow diagram leads to a first step S1.

A new job is received and added to the print queue of the printing system according to the invention in the first step S1. The job specifications of this job, i.e. the values of all attributes in the print job ticket, are read.

In particular, a receiving material, a number of copies, a number of pages of the document and a finishing action specified in the print job ticket is retrieved.

Then, in a second step S2, a first estimation of an amount of receiving material needed for a print job is provided based on the attributes in the print job ticket. The amount may be in units of sheets or in length units of roll material.

In a third step S3 waste amounts of receiving material with the same receiving material characteristics as of the print job are retrieved from storage in the controller or elsewhere in the printing system. Even a database comprising outcomes of previous print jobs on the printing system or other similar types of printing systems may be consulted.

In a fourth step S4 the first estimation of the amount of receiving material needed by the print job is increased based on the retrieved waste amounts of receiving material.

The method ends in an end point B of the flow diagram.

In a further embodiment the increased amount of receiving material needed by the print job is displayed at the user interface of the printing system. The operator immediately sees that the increased amount needs to be entered in an input tray or on the input roll holder of the printing system. A scheduler for scheduling the print jobs in time and replenishments of the receiving material may also be adapted and displayed at the user interface.

According to an embodiment the fourth step S4 of increasing the first estimation takes also into account the degree of skills of the operator handling the print job. The degree of skills of an operator influences the amount of waste. An experienced operator will make less mistakes and is handier than a less experienced operator. The degree of skills of an operator may be entered via the user interface of the printing system and may be received in an internal operator management system or it may be entered directly in the internal operator management system. An operator may enter the waste amounts into the outcome storage by firstly identifying himself. The internal operator management system may then be consulted to find out what the skills of the operator are.

According to another embodiment of the method the steps S1, S2, S3, S4 are also applied to an amount of marking material needed for a print job based on the print job ticket.

According to an embodiment the print job ticket provides information about a finishing step by means of a finisher after printing the print job and the steps S1, S2, S3, S4 are also applied an amount of finishing material needed for the print job based on the finishing specifications in the print job ticket.

According to an embodiment of the method the steps S1, S2, S3 and S4 are repeated for every print job arriving in the print job queue of the printing system. It is checked whether another print job has meanwhile been received and added to the print queue. If this is the case, the new job is scheduled and the steps S1, S2, S3 and S4 are executed for this print job. If necessary, the schedule of print jobs is adapted.

Figure 5:
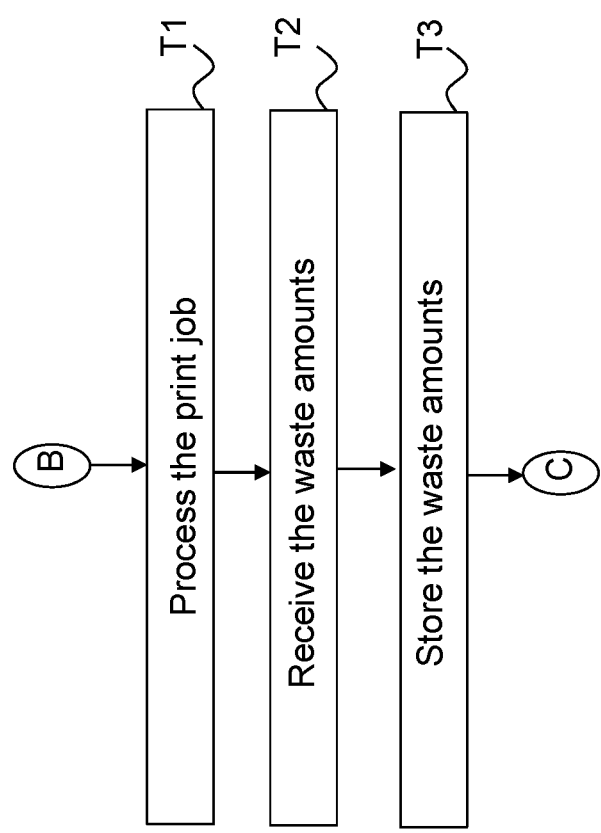
FIG. 5 is a flow diagram illustrating a second method according to the invention.

FIG. 5 shows a second embodiment of the method according to the invention. After applying the steps S1, S2, S3, S4 of FIG. 4 the method may proceed to point B in FIG. 5 which leads to a first step T1 of FIG. 5.

In the first step T1 the print job is processed. The print job is printed on the receiving material and, if specified in the print job ticket, finished by a finisher. Waste of receiving material may happen during printing and finishing of the print job.

In a second step T2 waste amounts are received by the controller of the printing system. The waste amounts may be entered by an operator via the user interface of the printing system, or—more advanced—may already be automatically registered by the controller via sensors and/or count mechanism in the input tray, in the output tray, in the paper path of the printing system or in the finisher when used. Waste amounts wasted during printing may be separately received from waste amounts wasted during finishing. In a third step T3 the waste amounts are stored in the digital outcome storage according to the invention for further use in the processing of a next print job. Waste amounts wasted during printing may be separately stored from waste amounts wasted during finishing—as for example shown in the columns 306, 307 in FIG. 3. The method ends in an endpoint C.

The flow diagrams in FIGS. 4-5 are merely exemplary. Combination of the flow diagrams in FIG. 4 and FIG. 5 with each other or with other embodiments of the method according to the invention may be envisioned, even provided with additional steps according to the embodiments of the printing systems according to the invention and according to the embodiment of the methods according to the invention which are described here-above.

The above disclosure is intended as merely exemplary, and not to limit the scope of the invention, which is to be determined by reference to the following claims.

The invention claimed is:

1. A printing system for printing a print job on a receiving material with receiving material characteristics according to a print job ticket, the printing system comprising:
   a print engine for providing marking material with marking material characteristics to the receiving material in order to print at least one image defined by the print job; and
   an electronic controller configured to control the print engine, to provide a first estimation of an amount of receiving material needed for a print job based on the print job ticket;
   wherein the electronic controller comprises a digital outcome storage configured to store first waste amounts of receiving material per print job and a receiving material characteristic per print job during printing errors of print jobs, and
   wherein the electronic controller is configured to retrieve from the digital outcome storage first waste amounts of receiving material with the same receiving material characteristic as the print job and to use the retrieved first waste amounts of receiving material for increasing the first estimation of the amount of receiving material needed by the print job.

2. The printing system according to claim 1, wherein the electronic controller is configured to provide a first estimation of an amount of marking material needed for the print job based on the print job ticket, the digital outcome storage is configured to store first waste amounts of marking material during printing errors of print jobs, and the electronic controller is configured to retrieve from the digital outcome storage first waste amounts of marking material with the same marking material characteristics as of the print job and to use the retrieved first waste amounts of marking material for increasing the first estimation of the amount of marking material needed by the print job.

3. The printing system according to claim 2, wherein the printing system comprises a finisher with finisher characteristics for finishing the print job, the electronic controller is configured to provide a first estimation of an amount of finishing material needed for the print job based on the print job ticket, the digital outcome storage is configured to store second waste amounts of receiving material, second waste amounts of marking material and first waste amounts of finishing material during finishing errors of print jobs, and the electronic controller is configured
   to provide the first estimations of the amounts of receiving, marking and finishing material,
   to retrieve from the digital outcome storage the first waste amounts of receiving material, marking material and finishing material, and the second waste amounts of receiving material and marking material with the same receiving material, marking material, finishing material and finisher characteristics respectively as of the print job, and to use the retrieved first and second waste amounts for increasing the first estimations of the amounts of receiving, marking and finishing material needed by the print job.

4. The printing system according to claim 1, wherein the printing system comprises a user interface for communication with an operator of the printing system, which user interface is configured to display the increased first estimation.

5. The printing system according to claim 4, wherein the user interface is configured to receive the first waste amounts after each print job in order to store the first waste amounts in the digital outcome storage.

6. The printing system according to claim 1, wherein the electronic controller is configured to establish the first waste amounts during each print job and to store the first waste amounts in the digital outcome storage.

7. The printing system according to claim 1, wherein the electronic controller is configured to receive first waste amounts of another printing system which is connected to a same network as the printing system and to store the first waste amounts of the other printing system in the digital outcome storage.

8. The printing system according to claim 1, wherein the electronic controller comprises the digital outcome storage.

9. The printing system according to claim 1, wherein the digital outcome storage is connected via a digital network to the printing system.

10. A method for a printing system for printing a print job on a receiving material with receiving material characteristics according to a print job ticket, the method comprising the steps of:
storing first waste amounts of receiving material per print job and a receiving material characteristic per print job during printing errors of print jobs,
receiving a print job with a print job ticket,
providing a first estimation of an amount of receiving material needed for a print job based on the print job ticket,
retrieving the first waste amounts of receiving material per print job with the same receiving material characteristic as the print job, and
increasing the first estimation of the amount of receiving material needed by the print job based on the retrieved first waste amounts of receiving material.

11. The method according to claim 10, wherein the method comprises the steps of processing the print job according to the print job ticket, receiving the first waste amounts of receiving material wasted during the processing of the print job and storing the first waste amounts with properties of the print job and with the receiving material characteristic in a digital outcome storage of the printing system.

12. The method according to claim 11, wherein the printing system comprises a finisher with finisher characteristics for finishing the print job using finishing material and the method comprises the steps of
providing a first estimation of an amount of finishing material needed for the print job based on the print job ticket,
retrieving waste amounts of receiving material, marking material and finishing material during finishing of the print job by the finisher, the waste amounts of receiving, marking and finishing material with the same receiving, marking and finishing material and finisher characteristics respectively as of the print job, and
increasing the first estimations of the amounts of receiving, marking and finishing material needed by the print job based on the retrieved waste amounts.

13. The method according to claim 10, wherein the step of increasing the first estimation takes into account the degree of skills of the operator handling the print job.

14. The method according to claim 10, wherein the method comprises the steps of
providing a first estimation of an amount of marking material needed for a print job based on the print job ticket,
retrieving waste amounts of marking material with the same marking material characteristics as of the print job, and
increasing the first estimation of the amount of marking material needed by the print job based on the retrieved waste amounts of marking material.

15. A non-transitory recording medium comprising computer-executable program code configured to instruct a controller of a printing system and a computer to perform a method according to claim 10.

* * * * *